United States Patent
Mueller et al.

(10) Patent No.: US 10,237,036 B2
(45) Date of Patent: Mar. 19, 2019

(54) REPORTING DOWNLINK CONNECTION FAILURE USING LOW BANDWIDTH UPLINK PILOT SIGNAL

(71) Applicant: HUAWEI TECHNOLOGIES CO., LTD., Shenzhen, Guangdong (CN)

(72) Inventors: Axel Mueller, Munich (DE); Luca Rose, Boulogne Billancourt (FR)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/928,541

(22) Filed: Mar. 22, 2018

(65) Prior Publication Data
US 2018/0212729 A1    Jul. 26, 2018

Related U.S. Application Data

(63) Continuation of application No. PCT/EP2015/072102, filed on Sep. 25, 2015.

(51) Int. Cl.
*H04L 5/00* (2006.01)
*H04B 7/06* (2006.01)
(Continued)

(52) U.S. Cl.
CPC ......... *H04L 5/0048* (2013.01); *H04B 7/0617* (2013.01); *H04W 48/00* (2013.01);
(Continued)

(58) Field of Classification Search
CPC ... H04L 5/00; H04L 5/003; H04L 5/22; H04L 5/0048; H04L 5/06; H04B 1/76;
(Continued)

(56) References Cited

U.S. PATENT DOCUMENTS 6,628,953 B1 * 9/2003 Dillon .................. H04W 36/16
                                                          455/452.1
7,663,546 B1    2/2010 Miyamoto et al.
(Continued)

FOREIGN PATENT DOCUMENTS

| EP | 2278724 A1 | 1/2011 |
| EP | 2315482 A1 | 4/2011 |
| WO | 2009047740 A2 | 4/2009 |

OTHER PUBLICATIONS

Jingjing Chen et al.,"Demonstration of Analog Millimeter-wave Fronthaul Link for 64-QAM LTE Signal Transmission",2015 IEEE 82nd Vehicular Technology Conference (VTC2015-Fall),Sep. 6, 2015, total 6 pages.
(Continued)

*Primary Examiner* — Meless N Zewdu
(74) *Attorney, Agent, or Firm* — Kilpatrick Townsend & Stockton LLP (57) ABSTRACT

A method comprising, at a mobile station, transmitting a pilot message to a base station in response to determining that no signal has been received at the mobile station within a predetermined time period or that a received signal has been below a predetermined intensity within a predetermined time period, said pilot message comprising a pilot tone sent at reduced bandwidth, and receiving a response from the base station, said response beamsteered towards the receive direction and/or power of the pilot message.

16 Claims, 5 Drawing Sheets

(51) Int. Cl.
*H04W 48/20* (2009.01)
*H04W 52/32* (2009.01)
*H04W 52/30* (2009.01)
*H04W 88/18* (2009.01)
*H04W 72/02* (2009.01)
*H04W 74/04* (2009.01)
*H04W 76/00* (2018.01)
*H04W 88/02* (2009.01)
*H04W 88/06* (2009.01)
*H04W 72/04* (2009.01)
*H04W 48/00* (2009.01)
*H04B 7/0452* (2017.01)
*H04W 28/20* (2009.01)
*H04L 5/06* (2006.01)
*H04W 28/12* (2009.01)
*H04W 28/16* (2009.01)

(52) U.S. Cl.
CPC .......... *H04W 48/20* (2013.01); *H04W 52/30* (2013.01); *H04W 52/32* (2013.01); *H04W 72/02* (2013.01); *H04W 72/04* (2013.01); *H04W 74/04* (2013.01); *H04W 76/00* (2013.01); *H04W 88/02* (2013.01); *H04W 88/06* (2013.01); *H04W 88/18* (2013.01); *H04W 88/184* (2013.01); *H04B 7/0452* (2013.01); *H04B 7/06* (2013.01); *H04L 5/00* (2013.01); *H04L 5/06* (2013.01); *H04W 28/12* (2013.01); *H04W 28/16* (2013.01); *H04W 28/20* (2013.01); *H04W 52/325* (2013.01); *H04W 72/042* (2013.01); *H04W 72/046* (2013.01); *H04W 72/0413* (2013.01); *H04W 72/0446* (2013.01); *H04W 72/0453* (2013.01)

(58) Field of Classification Search
CPC .. H04B 7/0413; H04B 7/0417; H04B 7/0421; H04B 7/0439; H04B 7/0452; H04B 7/08; H04B 7/0495; H04B 7/06; H04B 1/66; H04B 7/0404; H04B 14/046; H04B 7/0617; H04B 16/28; H04B 7/0491; H04W 48/20; H04W 52/32; H04W 52/325; H04W 24/10; H04W 76/10; H04W 76/11; H04W 76/18; H04W 76/19; H04W 80/00; H04W 16/28; H04W 72/046; H04W 48/00; H04W 48/12; H04W 72/02; H04W 72/04; H04W 72/0413; H04W 72/042; H04W 72/0446; H04W 72/0453; H04W 88/00; H04W 88/02; H04W 88/06; H04W 28/16; H04W 28/20; H04W 28/12; H04W 52/30; H04W 74/04; H04W 76/00; H04W 88/184; H04W 88/18
See application file for complete search history.

(56) References Cited

U.S. PATENT DOCUMENTS

| | | | | |
|---|---|---|---|---|
| 8,995,589 | B1* | 3/2015 | Qiu | H03L 7/099 375/346 |
| 2005/0232138 | A1* | 10/2005 | Byun | H04L 5/023 370/208 |
| 2008/0019279 | A1* | 1/2008 | Kim | H04L 1/0061 370/241 |
| 2008/0187027 | A1* | 8/2008 | Malladi | H04B 1/713 375/135 |
| 2010/0035562 | A1 | 2/2010 | Alberth, Jr. et al. | |
| 2011/0013585 | A1* | 1/2011 | Jitsukawa | H04L 5/0044 370/330 |
| 2011/0026637 | A1* | 2/2011 | Lee | H04L 5/0023 375/295 |
| 2012/0163192 | A1* | 6/2012 | Bae | H04W 76/18 370/242 |
| 2012/0208567 | A1* | 8/2012 | Mesecher | H04B 7/086 455/456.5 |
| 2013/0142191 | A1 | 6/2013 | Fourtet et al. | |
| 2014/0003544 | A1* | 1/2014 | Oketani | H04L 27/261 375/259 |
| 2014/0086205 | A1* | 3/2014 | Nakasato | H04L 5/0037 370/330 |
| 2016/0112924 | A1* | 4/2016 | Turakhia | H04W 36/30 370/332 |
| 2017/0187504 | A1* | 6/2017 | Qian | H04L 5/0048 |
| 2017/0195027 | A1* | 7/2017 | Baek | H04B 7/0617 |
| 2017/0373807 | A1* | 12/2017 | Hessler | H04L 5/005 |

OTHER PUBLICATIONS

Neal Patwari et al., "Location Estimation Accuracy in Wireless Sensor Networks", 2002,total 5 pages.
L. Catarinucci et al., "Switched-beam antenna for wireless sensor network nodes", Progress In Electromagnetics Research C, vol. 39, 193-207, 2013,total 15 pages.
F. A. Tobagi and L. Kleinrock, "Packet switching in radio channels: Part II—The hidden terminal problem in carrier sense multiple access and the busy-tone solution," IEEE Trans. Commun., vol. COM-23, pp. 1417-1433, Dec. 1975, total 17 pages.
C. Wu and V. O. K. Li, "Receiver-initiated busy-tone multiple access in packet radio networks," in Proc. ACM SIGCOMM '87, 1987, pp. 336-342. ,total 7 pages.
3GPP TR 45.820 V1.0.0 (Mar. 2015);3rd Generation Partnership Project;Technical Specification Group GSM/EDGE Radio Access Network;Cellular System Support for Ultra Low Complexity and Low Throughput Internet of Things; (Release 13),total 164 pages.
3GPP TR 45.820 V13.0.0 (Aug. 2015);3rd Generation Partnership Project;Technical Specification Group GSM/EDGE Radio Access Network;Cellular system support for ultra-low complexity and low throughput Internet of Things (CIoT) (Release 13),total 495 pages.
3GPP TSG-GERAN Meeting #65 GP-150076,"Combined narrow-band and spread spectrum physical layer for IoT", Change Request TR45.820,Current version:0.4.0,Mar. 8-13, 2015,total 21 pages.
3GPP, TSG GERAN#65 Tdoc GP-150142,"Co-existence considerations for CIoT application",Ericsson LM,Mar. 9-13, 2015,total 10 pages.
3GPP TSG GERAN#65 GP-150195,"Narrowband Hybrid Modulation—Coexistence with legacy GPRS users",Nokia Networks,Mar. 9-13, 2015,total 5 pages.
3GPP TSG GERAN#65 GP-150229,"CIoT—Coexistence with GSM (update of GP-150083)",Huawei Technologies Co., Ltd. et al.,Mar. 9-13, 2015,total 11 pages.
3GPP TSG GERAN#65 meeting GP150281,"Pseudo CR 45-820 C-UNB System overview",SIGFOX Wireless,Mar. 9-12, 2015,total 2 pages.
3GPP TSG GERAN#65 meeting GP150281,"Pseudo CR 45-820 C-UNB Physical layer description",SIGFOX Wireless,Mar. 9-12, 2015;total 4 pages.
3GPP TSG GERAN#65 meeting GP150283,"Pseudo CR 45-820 C-UNB Link layer design",SIGFOX Wireless,Mar. 9-12, 2015,total 5 pages.
3GPP TSG GERAN#65 meeting GP150284,"Pseudo CR 45-820 C-UNB System evaluation",SIGFOX Wireless,Mar. 9-12, 2015,total 3 pages.
"Si868_25mW SIGFOX module User guide",User guide version V1.2,Hardware integration and software management manual,Release for SIGFOX module software version V1.3,SIGFOX,Si868-25mW RF Module,User guide version V1.3;Software version V1.3,Wireless products and solution,2015,total 20 pages.
"Usage of the TDK51xx/TDA71xx transmitters in the 868 MHz ISM band",Wireless Control,Rev. 1.0, May 15, 2012, total 30 pages.
Robert Young et al.,"Introduction to "Clean-Slate" Cellular IoT (56) References Cited

OTHER PUBLICATIONS radio access solution",Huawei & Neul,dated Apr. 2015, total 13 pages.

* cited by examiner

REPORTING DOWNLINK CONNECTION FAILURE USING LOW BANDWIDTH UPLINK PILOT SIGNAL

CROSS-REFERENCE TO RELATED APPLICATIONS

This application is a continuation of International Application No. PCT/EP2015/072102, filed on Sep. 25, 2015, the disclosure of which is hereby incorporated by reference in its entirety.

FIELD

The present application relates to the field of wireless networks, in particular to wireless links between a transmitter, such as a mobile station, and a base station.

BACKGROUND

In wireless networks, transmit nodes communicate with base stations in their vicinity. In many cases, a transmit node is a mobile station connecting to the base station that provides a strongest signal as received at the mobile station. Such base station may be the closest base station in terms of Euclidean distance. Alternatively, connection may instead be established with a base station further away from the mobile station, such as when a stronger signal is received from the base station further away than from the closer base station.

In some situations, even the strongest signal received at the mobile device may be insufficient to establish a reliable connection.

SUMMARY

An objective of the present document is establishing a connection from a mobile station to a base station despite weak or otherwise unfavorable signal conditions.

A first aspect of the invention comprises a method comprising, at a mobile station, transmitting a pilot message to a base station in response to determining that no signal has been received at the mobile station within a predetermined time period or that a received signal has been below a predetermined intensity within a predetermined time period, said pilot message comprising a pilot tone sent at a reduced bandwidth, and receiving a response from the base station, said response beamsteered towards the receive direction and/or power of the pilot message.

This first aspect is advantageous in that it uses pilot tones, such as non-orthogonal pilot tones, at a reduced bandwidth, such as a bandwidth reduced in comparison to a standard bandwidth used in communication according to a protocol used between mobile station and base station. Using a reduced bandwidth increases signal strength of the pilot tone. Accordingly, the likelihood for the base station recognizing the pilot message is increased despite unfavorable signal conditions. The first aspect is also advantageous for using reduced bandwidth in response to determining that signal conditions are actually unfavorable, namely by determining that no signal is received or that a received signal is below a predetermined intensity. Thereby, the first aspect allows establishing connections in a standard manner as long as normal signal conditions are present. This way, connections are established in a most efficient way in favorable as well as in unfavorable conditions.

According to a first implementation of the first aspect, the pilot tone comprises a sine or sinus tone of a length determined from a maximum bandwidth available for transmission and from a number of samples required to apply a predefined window function on the pilot tone.

This first implementation advantageously increases signal strength of the pilot tone by determining the maximum bandwidth available, such as bandwidth defined in a predefined communication protocol, or such as a bandwidth determined from a signal of the base station. A wave length of the pilot tone is determined from the maximum bandwidth as well as from the number of samples required by a window function. This window function may be set by the base station and may be used by the base station to attenuate spectral leakage when transmitting. By deriving wave duration from maximum bandwidth and from required window function samples, it becomes possible to further increase the signal strength of the pilot tone, in particular when wave duration is decreased.

A second possible implementation according to the first implementation of the first aspect comprises setting the sinus tone duration in seconds as $n_{win}*2/BW$, wherein $n_{win}$ is a scalar number of samples required by the window function and BW is the maximum available bandwidth.

This implementation provides a concrete embodiment of determining sinus tone length in the first implementation. The formula of the second implementation defines the minimum pilot tone length to be used, hence optimizing signal strength of the pilot tone while still complying with the window function.

A third possible implementation according to the second implementation of the first aspect defines obtaining $n_{win}$ from a lookup table of scalar values.

This is advantageous in that it provides quick retrieval of values required for configuring the pilot tone. Because values may be known in advance depending on window function, lookup table represent a convenient means for retrieving the values.

According to a fourth implementation of the first aspect, the pilot tone comprises a waveform non-orthogonal in frequency, time, sequence and/or space with respect to waveforms of other mobile stations.

Conventionally, waveforms of different mobile stations connected to a same base station are orthogonal with respect to one another, as this assists the base station in distinguishing the individual mobile stations. However, in unfavorable conditions as detected in the first aspect, the vicinity of the base station or at least the vicinity of the mobile station can be expected to have a low density of mobile stations. In sporadic communication, which is to be expected under such conditions, orthogonality is not required. Furthermore, using non-orthogonal signal sequences increases signal strength, as orthogonal signals provide a higher peak-to-average-power ratio.

A fifth implementation of the first aspect as such or according to any one of the first to fourth implementations of the first aspect defines that the pilot tone is transmitted at a bandwidth smaller than the bandwidth for subsequent transmission of data.

Advantages of using a small bandwidth have been discussed above. The fifth implementation adds to this advantage in that it increases bandwidth once a connection has been established based on the pilot message. This is based on the insight that an established connection may be less prone to weak signal conditions than the actual process of establishing the connection. Reducing bandwidth for establishing the connection increases signal strength, thereby assisting in connecting at the cost of sending less data. Afterwards, bandwidth may be increased in order to send more data again.

According to a sixth implementation of the first aspect as such or according to any one of the first to fifth implementations, the pilot tone is transmitted at a frequency lower than for subsequent transmission of data.

Similar to the fifth implementation, the sixth implementation advantageously reduces energy consumption of the signal after establishing the connection. The reasoning behind this approach is that the connection, once established, does not require increased signal strength, and a lower frequency may hence be used afterwards for normal data exchange.

A seventh implementation of the first aspect as such or according to any one of the first to sixth implementations is directed to the pilot tone transmitted at a transmit power higher than the power for subsequent transmission of data.

This implementation defines transmitting signals with reduced power once a connection is established. Power may be reduced by increasing bandwidth, increasing frequency, decreasing transmit amplifier gain, or other measures. Reducing power is based on the insight that establishing the connection according to the first aspect demands higher signal strength than is required subsequent to the establishing. The advantage is saving power consumption during normal data exchange.

An eight implementation of the first aspect as such or according to any one of the first to seventh implementations comprises prepending the pilot message to a data message prior to transmitting the pilot message.

Prepending the pilot message, including the pilot tone, is advantageous for ensuring that a connection is established prior to encountering actual message data. Further, the message data may be ready to send once the connection exists.

According to a ninth implementation based on the eight implementation, prepending the pilot message comprises adding a waiting time between the pilot message and the data message.

This is advantageous for ensuring that a connection is actually established when starting to transmit actual data, and may be advisable when the base station is not entirely digital.

A tenth implementation of the first aspect as such or according to any one of the first to ninth implementations comprises obtaining the pilot message from a lookup table, from a dedicated oscillator, or by direct digital synthesis, prior to transmitting the pilot message.

This implementation is advantageous to the extent that the pilot message may not have to be calculated on the fly based on current protocol parameters and other conditions, but can conveniently be retrieved from a lookup table or similar entities. This accelerates establishing the connection. In some embodiments, the pilot message may alternatively be obtained by direct digital synthesis. In this case, an advantage is that connection establishing does not rely on potentially incomplete tables, but can independently take account of any parameters required by the current protocol or by the respective base station.

A second aspect defines a mobile station comprising transmitting means adapted to perform the method according to the first aspect and according to any of the aforementioned implementations. Such a mobile device is advantageous for the reasons provided above and for representing a mobile device capable to adapt to any base station, irrespective of whether favorable or unfavorable conditions for transmission are present. The mobile device according to the second aspect works both in environments with high and low density of mobile devices, with desirable and less desirable signal conditions for connecting to a base station.

A third aspect defines a system, comprising a mobile station adapted to perform the method of the first aspect and according to any of the aforementioned implementations, and a base station adapted to respond to the mobile station by beamsteering towards said mobile station in response to receiving a pilot message from said mobile station.

This third aspect is advantageous for similar reasons as those provided above. The system advantageously operates both with high and low densities of mobile devices, and both with high and low signal strength provided by the base station, as well as with different distances of the mobile device to the base station.

DETAILED DESCRIPTION

Figure 1A:
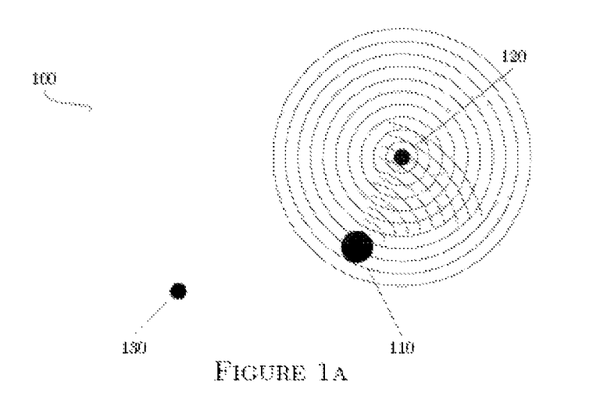
FIG. 1a illustrates a system in accordance to conventional techniques.

FIG. 1a illustrates a system 100 reflecting conventional operation of mobile stations and a base station.

FIG. 1a shows a base station 110, a first mobile station 120, and a second mobile station 130. The distance of the first mobile station 120 from the base station 110 is shorter than the distance of the second mobile station 130 from the base station 110. Distance may refer to Euclidean distance, with the effect that signals transmitted by the base station 110 may be more attenuated when reaching the second mobile station 130 as compared to when reaching the first mobile station 120. Signal attenuation may also be due to other factors than distance, such as walls or multi-path propagation between base station 110 and one of the mobile stations. The illustrated distances are provided as a mere example of how signals may attenuate, and should not be construed as limiting.

Mobile station 120 is shown as transmitting a signal, illustrated as concentric circles around mobile station 120. Base station 110 is illustrated as within reach of the mobile station 120, which means that the signal transmitted by the mobile station 120 is detected and recognized at the base station 110. In response to recognizing the signal, base station 110 transmits a response signal, illustrated as a sequence of circle sections. The response signal is directed to mobile station 120 using a technique known as beamforming or beamsteering. The response signal is strong enough to reach mobile station 120, as is illustrated by mobile station 120 being entirely covered by some of the circle sections of the response signal. A connection between base station 110 and mobile station 120 is hence established.

Figure 1B:
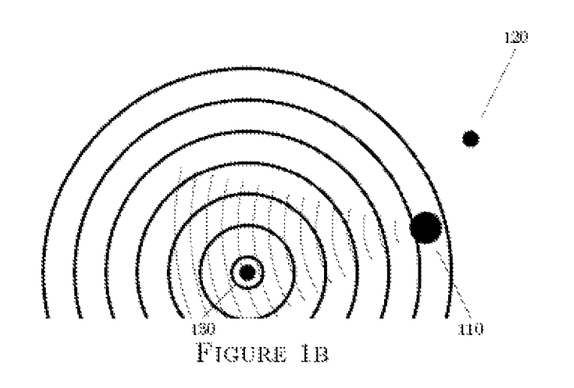
FIG. 1b illustrates a system in accordance with embodiments of the invention.

FIG. 1b illustrates a system 100 reflecting operation of mobile stations and a base station according to embodiments of the invention.

FIG. 1b is similar to FIG. 1a in that it depicts a base station 110 along with a first mobile station 120 and a second mobile station 130. Base station 130 is further away from base station 110 than the distance of mobile station 120 to base station 110. Alternatively, mobile station 130 may be as far from base station 110 as mobile station 120, or even closer, but may be subject to less favorable receiving and/or transmitting conditions, such as due to a wall or other obstacle, or due to multi-path propagation between mobile station 130 and base station 110.

The mobile station 130 may be configured to detect that signal conditions are unfavorable. In one embodiment, mobile station 130 determines that no signal has been received from the base station 110 or from any other base station within a predetermined time period. Such time period may be based on manufacturer settings or may be set by a developer or by a user of the mobile device 130. In another embodiment, mobile station 130 may be configured to detect a signal from a base station, such as from base station 110, but may determine that the received signal is too weak for establishing a connection with the base station. In this case, mobile station 130 may detect that a received signal has been below a predetermined intensity within a predetermined time period. Again, both predetermined time period and/or predetermined signal intensity may have been set by a manufacturer of the mobile device and/or may have been set or adjusted by a developer or a user of the mobile device. Predetermined values may also be derived by the mobile device or base station dynamically, such as based on the density of base stations in an area, the density of mobile devices in a cell defined by the base station, and/or by statistics reflecting successful attempts of mobile devices to connect to a base station.

In response to determining unfavorable signal conditions, as discussed above, mobile station 130 may be configured to transmit a pilot message to base station 110, said pilot message comprising a pilot tone. This pilot tone may be configured by mobile station 130 to improve the chances for establishing a connection to base station 110 despite the unfavorable signal conditions. In one embodiment, the pilot tone may be generated as comprising a reduced bandwidth as compared to the signals sent by other mobile stations, such as mobile station 120 discussed above. Reducing bandwidth may have several effects. A first effect is that reduced bandwidth will limit the amount of data transmitted. This effect is negligible in the present context, as sending the pilot tone is not intended to convey any significant content except a signal permitting the base station to recognize the mobile station. A second effect is that the receiver can employ narrower receive filters to match the smaller bandwidths, which reduces the amount of received noise, hence improving detectability of the pilot tone at a larger distance from the mobile station. A third effect is that signal strength will be increased with reduced bandwidth. These effects are illustrated in FIG. 1b by concentric circles around the second mobile station 130, said circles aligned at larger distances than the circles around mobile station 120 in FIG. 1a, and being thicker than those. As is also illustrated, the strength of the signals transmitted by mobile station 130 is high enough to cover base station 110, hence enabling the base station 110 to detect mobile station 130. Base station 110 responds to detecting mobile station 130 by beamsteering towards mobile station 130, effectively establishing a connection to mobile station 130.

Said beamsteering may be performed towards a direction of received pilot message or tone. Alternatively or in addition, beamsteering may be performed towards a direction of maximum signal strength from the mobile station 130. To this extent, embodiments of the invention may utilize known techniques such as Angle of Arrival once the pilot as provided by the invention has been detected.

Together, FIGS. 1a and 1b illustrate that conventional approaches suffice to establish a connection from base station 110 to mobile station 120 when signal conditions are sufficient, but that inventive measures are required to establish a connection between a base station and a mobile station that is subject to unfavorable signal conditions, such as mobile station 130.

The pilot tone sent by mobile station 130 may be regarded as a sporadic communication which is not sent permanently but only shortly in order to establish a connection, or at least to enable a base station in the vicinity to detect the mobile station. The pilot tone is low-throughput, as no significant content is required at the stage of establishing a connection, and as higher signal strength may be achieved this way. In many embodiments, the pilot tone is sent by the mobile station 130, and hence constitutes uplink communication. In some embodiments, sending a pilot message with pilot tone as discussed may alternatively or additionally be performed by a base station, and not by the mobile station.

Using a pilot tone by the mobile station in order to be detected by a base station is based on the insight that conventional wireless networks focus on a scenario with a high density of mobile stations within reach of a base station. In such cases, communication is generally affected by inference among multiple mobile stations communicating concurrently. The invention, on the other hand, focusses on unfavorable conditions which are due to high distances between neighboring base stations, for example, and which may be affected by signal noise, rather than interference. Because of this insight, the inventive approach of transmitting a pilot tone for establishing a connection has been found. In environments suffering from interference, transmitting a pilot tone as discussed above would be inappropriate, as the high strength, and possibly non-orthogonality of the pilot tone would further increase interference with other mobile stations, and may not have the desired effect of successfully establishing a connection. In combination with detecting insufficient signal from a base station, however, transmitting a pilot tone with the characteristics discussed herein advantageously allows connections in environments which are prone to weak signaling.

A further advantage of the inventive measures disclosed herein is reducing the technical demands imposed on the mobile stations. With conventional approaches, connections partially rely on smart devices as mobile stations, said smart devices capable to determine their exact position and report this position to a base station. This requirement is obviated with the present invention, as generating and transmitting a pilot tone may be performed by low cost mobile stations, as well. In this regard, the invention also reduces the power consumption of mobile devices.

Generating the pilot tone may include further measures applied in addition or alternatively to utilizing reduced bandwidth. In one embodiment, the pilot tone comprises a sine or sinus tone of a length determined from a maximum bandwidth available for transmission and from a number of samples required to apply a predefined window function on the pilot tone. For example, the pilot tone length may be determined as a minimum possible length based on the maximum possible bandwidth. The maximum possible bandwidth may be a bandwidth allowed by the base station, such as according to technical restrictions, to base station manufacturer settings, to restrictions imposed by a protocol used by the base station, and/or to legal restrictions. One or more out of a plurality of window functions may be used by the base station in order to provide spectral leakage attenuation when transmitting. Examples of window functions include Rectangular, Hanning, Hamming, Blackman, and Flat top functions. Each window function may require a respective number of samples $n_{win}$ for a sampling window. For example, given a desired window frequency response main lobe width of −3 dB, the rectangular function requires 0.88 samples, whereas Hanning requires 1.44, Hamming 1.30, Blackman 1.64, and Flat top 2.94. With a desired window frequency response main lobe width of −6 dB, Rectangular requires 1.21, Hanning 2.00, Hamming 1.81, Blackman 2.30, and Flat top 3.56 samples. For a given bandwidth, a minimum pilot tone length may be determined as $$T_{min}=n_{win}\, 2/BW,$$

wherein BW is the maximum possible bandwidth.

Minimum pilot tone length $T_{min}$ translates into the minimum number of samples Lw, given the sampling frequency of fs [Hz] by the relationship Lw=$T_{min}$/fs wherein fs is the sampling frequency. In a range of t=(0:Lw−1)/fs, parameter x of the pilot tone may be determined, in Mathlab™ syntax, as $$x=\mathrm{sqrt}(P_{tx})*\sin(2*pi*fc*t),$$

wherein $P_{tx}$ is the maximum transmit power and fc is the minimum center frequency of the mobile station. Accordingly, parameter y of the pilot tone amounts to $$y=w*x(1{:}\mathrm{LwSamples}),$$

$$\mathrm{LwSamples}=\mathrm{ceil}(Lw*fs)$$

wherein w corresponds to a set of window samples and may be determined, in Mathlab™ syntax, as $$w=\mathrm{flattopwin}(\mathrm{LwSamples}),$$

if the Flat top window function is used.

Figure 4:
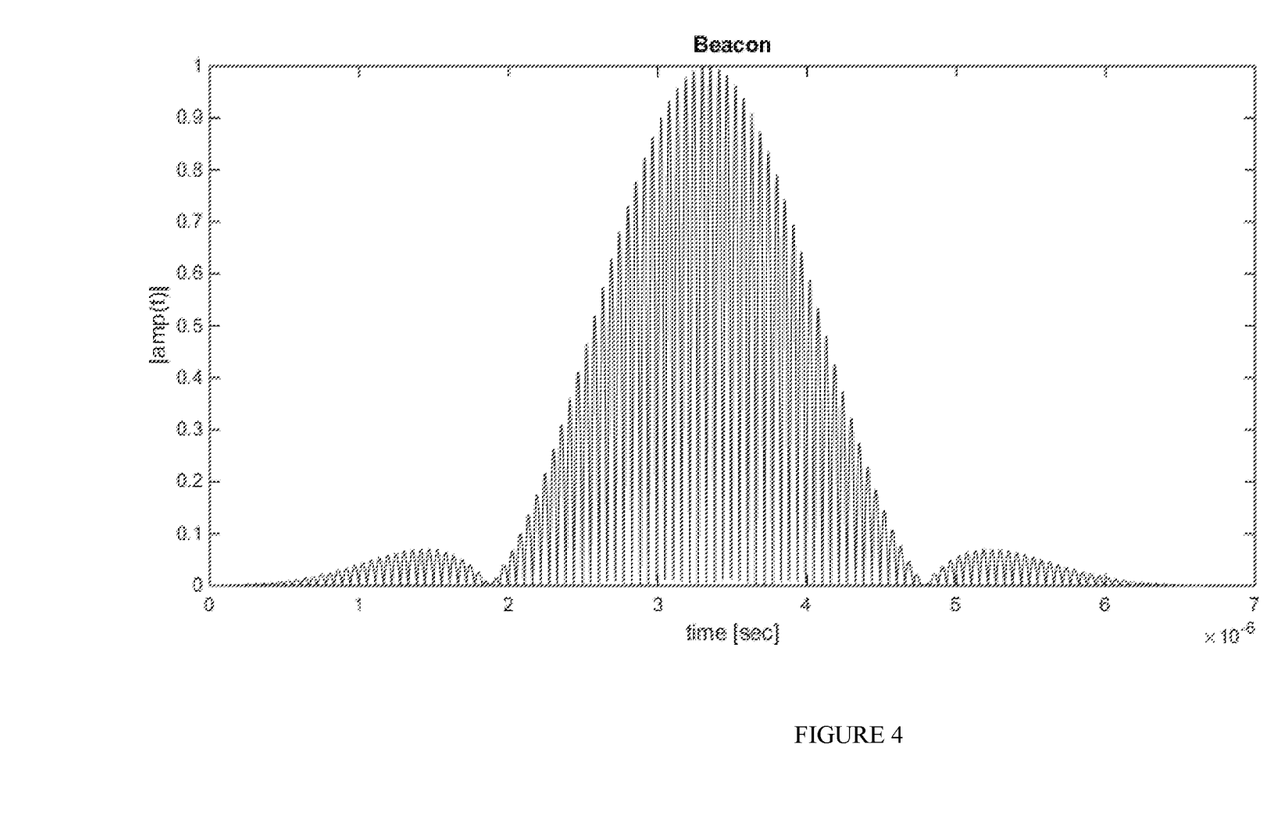
FIG. 4 is a graph illustrating a pilot tone according to embodiments of the invention.

An example pilot tone generated from these parameters is illustrated in FIG. 4.

The $n_{win}$ parameter may be determined from a lookup table of scalar values. In some embodiments, even the complete pilot message may be obtained from a lookup table. Alternatively, it may be obtained from a dedicated oscillator. In other cases it may be directly digitally synthesized according to the aforementioned steps.

The resulting pilot tone may comprise a waveform non-orthogonal in frequency, time, sequence and/or space with respect to waveforms of other mobile stations.

After transmitting the pilot tone and after successfully establishing a connection with the base station 110, mobile station 130 may return to a standard bandwidth, such as bandwidth used in conventional connections, such as the connection used by mobile station 120. Embodiments of the invention include the mobile station 130 generating and sending the pilot tone at a lower frequency than is common in conventional connection protocols, as is reflected by the minimum center frequency fc discussed above. However, subsequent to establishing the connection, frequency may be increased again to improve data exchange with the base station.

Figure 5:
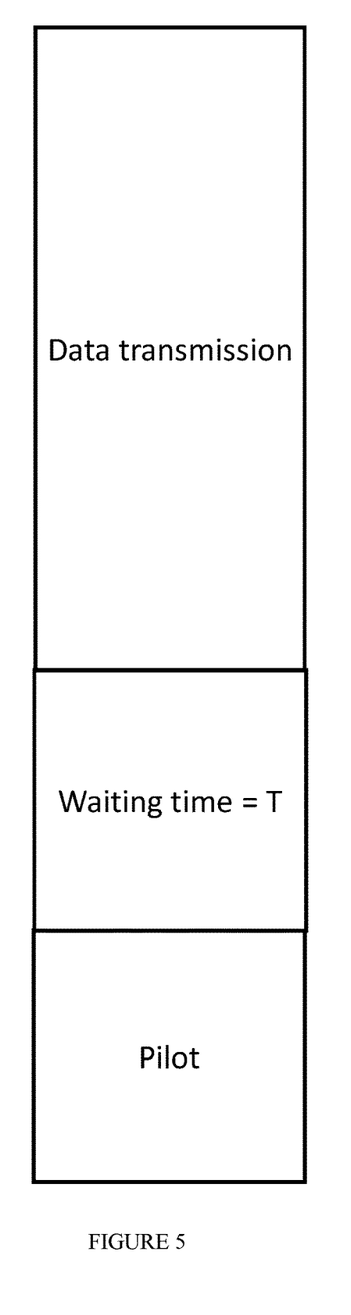
FIG. 5 is a black diagram of a pilot message according to embodiments of the invention.

According to specific embodiments, the pilot message may be prepended at the mobile station to a data message prior to transmitting the pilot message. This may accomplish starting data transmission directly after the connection is established based on the pilot tone. In some embodiments, a waiting time may be inserted between pilot tone and data message, such as in order to allow some time for setting up the connection. In particular, inserting a waiting time may depend on whether the base station comprises a fully digital receiver. If it is fully digital, no insertion of a waiting time may be required. Otherwise, inserting a waiting time may be advisable in order to allow time for establishing the connection. An example of a pilot message is illustrated in FIG. 5. The pilot message comprises transmission data. Prepended thereto is a pilot tone. Between pilot tone and pilot message, a waiting time is inserted.

Advantages of the above measures can be demonstrated with the IEEE 802.15.4 sensor system, also known as Zigbee. In this system, a link budget may be characterized as follows. Sensitivity $S_{rx}$ of the receive system of the base system may amount to −98 dBm, whereas mobile station maximum permissible transmit power $P_{tx}$ may be 0 dBm. The maximum bandwidth possible with the base station may be 1200 kHz, and its frequency is in the range of 902 to 928 MHz, with a data burst rate of 40 kbit/s. The base station may be capable of beamforming with a single beam without side lobes, and of creating a perfect sector beam to detect mobile stations. An example number of antenna elements, which may cover 360 degrees or less, is N=48, and the gain $G_{bf}$ of the base station obtained through beamforming may be $G_{bf}$=sqrt(N)=8.5 dBi. An example waveform may be based on the Flat top window function mentioned above.

Based on this configuration, the invention will accomplish energy savings as follows.

A message of 40 kbit may be transferred at 40 kbit/s in $T_{tx}$=1s. Without the invention, this message would be sent right away to the base station, thus requiring energy of $P_{tx}*T_{tx}$. With the invention, however, energy for the pilot tone and energy for the data message would have to be added, yielding $P_{tx}*2*4/BW+(P_{tx}-G_{bf})*T_{tx}$. With the values provided above, the ratio of energy consumed without the invention and of energy consumed with the invention is 6.93. This means that 6.93 times more messages could be sent with the same link budget, when using the invention, or amount of energy available at the mobile station.

It should be noted that some equations provided herein include both logarithmic and linear number representations. While such combinations of representations are not precise in a mathematical sense, they are common in engineering and deemed to be understood by the skilled reader.

Figure 2:
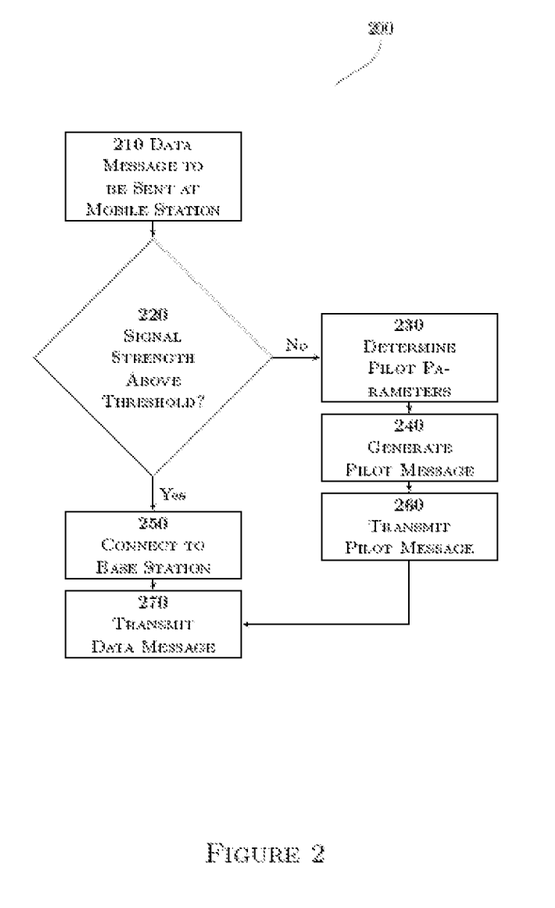
FIG. 2 is a flow diagram of a method in accordance with embodiments of the invention.

FIG. 2 illustrates a method 200 according to embodiments of the invention. At block 210, a mobile station, such as mobile station 130 in FIGS. 1*a* and 1*b*, identifies a data message ready to be sent.

At block 220, the mobile station determines whether signal strength from a base station is sufficient to transmit the data message. If positive, the mobile station may connect to the base station at block 250 and may transmit the data message at block 270. It should be noted that block 220 is optional and that in some embodiments, block 230, discussed below, may always directly follow block 210, such as when unfavorable conditions are expected without measuring signal strength.

If signal strength is insufficient, the method proceeds to block 230. Determining insufficient signal strength may be performed according to any mechanism discussed above. For example, no signal from a base station may have been detected within a predetermined time. Alternatively, a signal may not have exceeded a predetermined intensity within a predetermined time.

In this case, the mobile station may decide to utilize a pilot message for signaling a base station, and may determine parameters for a pilot tone to be included in the pilot message. These determinations may include any of the calculations and measures discussed herein. Subsequently, the mobile station may generate the pilot tone and pilot message at block 240. This may include prepending the pilot message and tone to the data message, possibly together with conditionally inserting a waiting time between pilot message and data message. Finally, the pilot message is transmitted at block 260, and the data message transmitted at block 270.

Figure 3:
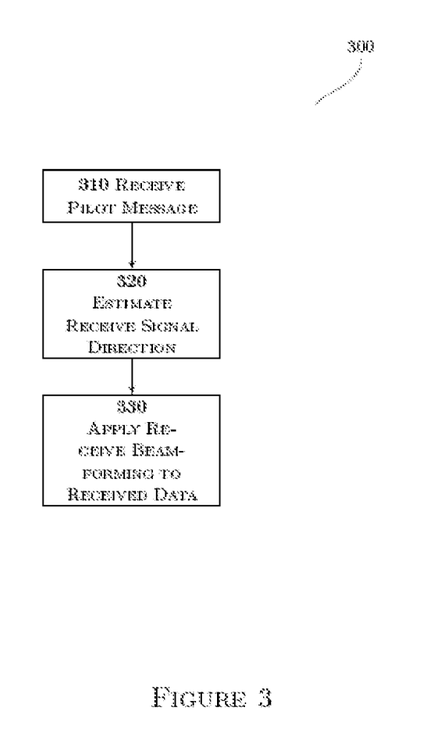
FIG. 3 is a flow diagram of a further method in accordance with embodiments of the invention.

FIG. 3 illustrates a method 300 to be performed at a base station, such as base station 110. At block 310, a pilot message as discussed above is received. At block 320, the base station estimates a receive direction and/or power for the mobile station that sent the pilot message. The method concludes with block 330, where receive beamforming is performed by the base station in a direction of the mobile station.

Although the present invention and its advantages have been described in detail, it should be understood that various changes, substitutions and alterations can be made herein without departing from the spirit and scope of the invention as defined by the appended claims.

The invention claimed is:

1. A method, comprising:
a mobile station transmitting a pilot message to a base station in response to determining that no signal has been received at the mobile station within a predetermined time period or that a received signal has been below a predetermined intensity within a predetermined time period, said pilot message comprising a pilot tone sent at reduced bandwidth; and
the mobile station receiving a response from the base station, said response being beam steered towards the receive direction and/or power of the pilot message; and, wherein
said pilot tone comprises a sinus tone of a length determined from a maximum bandwidth available for transmission and from a number of samples required to apply a predefined window function on the pilot tone, wherein the sinus tone duration is set as $n_{win}*2/BW$, wherein the $n_{win}$ is a scalar number of samples required by the window function and the BW is the maximum bandwidth available.

2. The method of claim 1, wherein $n_{win}$ is obtained from a lookup table of scalar values.

3. The method of claim 1, wherein the pilot tone comprises a waveform non-orthogonal in frequency, time, sequence, or space with respect to waveforms of other mobile stations.

4. The method of claim 1, wherein the pilot tone is transmitted at a bandwidth smaller than a data transmission bandwidth used for subsequent transmission of data.

5. The method of claim 1, wherein the pilot tone is transmitted at a frequency lower than a data transmission frequency used for subsequent transmission of data.

6. The method of claim 1, wherein the pilot tone is transmitted at a transmit power higher than a data transmission power used for subsequent transmission of data.

7. The method of claim 1, further comprising prepending the pilot message to a data message prior to transmitting the pilot message.

8. The method of claim 7, wherein said prepending the pilot message comprises adding a waiting time between the pilot message and the data message.

9. The method of claim 1, further comprising obtaining the pilot message from a lookup table, from a dedicated oscillator, or by direct digital synthesis, prior to transmitting the pilot message.

10. A mobile station, comprising:
a transmitter for transmitting a pilot message to a base station in response to determining that no signal has been received at the mobile station within a predetermined time period or that a received signal has been below a predetermined intensity within a predetermined time period, said pilot message comprising a pilot tone sent at reduced bandwidth, and
a receiver for receiving a response from the base station, said response beamsteered towards the receive direction and/or power of the pilot message; and, wherein
said pilot tone comprises a sinus tone of a length determined from a maximum bandwidth available for transmission and from a number of samples required to apply a predefined window function on the pilot tone, wherein the sinus tone duration is set as $n_{win}*2/BW$, wherein the $n_{win}$ comprises a scalar number of samples required by the window function and the BW comprises the maximum bandwidth available.

11. The mobile station of claim 10, wherein the $n_{win}$ is obtained from a lookup table of scalar values.

12. The mobile station of claim 11, wherein the pilot tone comprises a waveform non-orthogonal in frequency, time, sequence, or space with respect to waveforms of other mobile stations.

13. The mobile station of claim 12, wherein the pilot tone is transmitted at a bandwidth smaller than a data transmission bandwidth used for subsequent transmission of the data.

14. The mobile station of claim 10, wherein the pilot tone is transmitted at a frequency lower than a data transmission frequency used for subsequent transmission of the data.

15. The mobile station of claim 10, wherein the pilot tone is transmitted at a transmit power higher than a data transmission power used for subsequent transmission of the data.

16. A system, comprising:
a mobile station; and
a base station adapted to respond to the mobile station by beamsteering towards said mobile station in response to receiving a pilot message from said mobile station;
the mobile station comprising:
a transmitter for transmitting a pilot message to the base station in response to determining that no signal has been received at the mobile station within a predetermined time period or that a received signal has been below a predetermined intensity within a predetermined time period, said pilot message comprising a pilot tone sent at a reduced bandwidth; and
a receiver receiving a response from the base station, said response beamsteered towards the receive direction and/or power of the pilot message,
wherein said pilot tone comprises a sinus tone of a length determined from a maximum bandwidth available for transmission and from a number of samples required to apply a predefined window function on the pilot tone; wherein the sinus tone duration is set as $n_{win}*2/BW$, wherein the $n_{win}$ comprises a scalar number of samples required by the window function and the BW comprises the maximum bandwidth available.

* * * * *